United States Patent
Ban et al.

(10) Patent No.: US 7,925,634 B2
(45) Date of Patent: Apr. 12, 2011

(54) DATA RECOVERY METHOD AND SYSTEM OF MOBILE DEVICE

(75) Inventors: Jung-Min Ban, Gum-si (KR); Suk-Woo Chae, Daegu Metropolitan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 11/637,675

(22) Filed: Dec. 13, 2006

(65) Prior Publication Data

US 2007/0271314 A1    Nov. 22, 2007

(30) Foreign Application Priority Data

May 17, 2006  (KR) .................. 10-2006-0044075

(51) Int. Cl.
*G06F 17/30*    (2006.01)

(52) U.S. Cl. ........................................ 707/686

(58) Field of Classification Search .................. None
See application file for complete search history.

(56) References Cited

U.S. PATENT DOCUMENTS

| | | | |
|---|---|---|---|
| 6,321,158 B1* | 11/2001 | DeLorme et al. | 701/201 |
| 2003/0236788 A1* | 12/2003 | Kanellos et al. | 707/100 |
| 2005/0283662 A1* | 12/2005 | Li et al. | 714/13 |
| 2006/0184987 A1* | 8/2006 | Allen et al. | 725/100 |
| 2007/0174354 A1* | 7/2007 | Kodama et al. | 707/202 |
| 2007/0266099 A1* | 11/2007 | Wang et al. | 709/206 |
| 2008/0109477 A1* | 5/2008 | Lue | 707/102 |
| 2008/0208617 A1* | 8/2008 | Onyon et al. | 705/1 |

* cited by examiner

*Primary Examiner* — Don Wong
*Assistant Examiner* — Belinda Xue
(74) *Attorney, Agent, or Firm* — Roylance, Abrams, Berdo & Goodman, L.L.P.

(57) ABSTRACT

A data recovery method and system for a mobile device which is capable of selectively recovering data deleted by a user is provided. The data recovery method of the present invention includes assigning a portion of a memory as a data recovery region, creating recovery lists, each comprising a recovery time and recovery volume, storing data deleted from the memory into the data recovery region on the basis of the recovery lists, displaying the data recovery lists when a data recovery is requested, and recovering the deleted data from the data recovery region when the a data to be recovered is selected from the recovery lists. The data recovery method of the present invention makes it possible to recover the data deleted intentionally or accidentally in the mobile device.

15 Claims, 5 Drawing Sheets

DATA RECOVERY METHOD AND SYSTEM OF MOBILE DEVICE

CROSS REFERENCE TO RELATED APPLICATIONS

This application claims the benefit under 35 U.S.C. §119(a) of a Korean Patent Application, Serial No. 2006-0044075, filed in the Korean Intellectual Property Office on May 17, 2006, the entire contents of which is hereby incorporated by reference.

BACKGROUND OF THE INVENTION

1. Field of the Invention

The present invention relates to a mobile device. More particularly, the present invention relates to a data recovery method and system for a mobile device that is capable of selectively recovering data deleted by a user.

2. Description of the Related Art

An information-processing device, such as a personal computer (PC), a personal digital assistant (PDA) and a mobile telephone, is typically equipped with a keypad which functions as an input means. The user inputs alphanumeric characters and instructions by manipulating the keypad.

Generally, telephones can be classified into wired and wireless phones. Wired phones are usually installed in homes and offices and wireless phones are represented by personal communication service (PCS) phones and cellular phones. Recently, the personal digital assistant (PDA) devices have been equipped with wireless communication functions. Laptop computers can also be used for wireless communication with auxiliary communication interface devices. These wireless communication devices are called mobile devices or portable terminals because they support mobility.

Technological advancements and the rising usage of mobile communication in recent years have influenced people's everyday lives dramatically. As a result of these technological advancements, mobile devices are becoming increasingly popular and widely accepted for data communications as well as for conventional voice communications. Also, the wireless communications devices are likely to provide useful functions implemented with application programs such as a calendar planner and a short message service (SMS). Further, the mobile device supports multimedia services, whereby a user can edit and exchange the various multimedia contents such as pictures, sounds, and games. For example, the mobile terminal can take pictures with its built-in camera module, edit and transmit the pictures and download e-book, character pictures, bell sounds, MP3 music, and mobile games.

Increases in mobile device intelligence and data capacity results in an increase in the storage capacity. Occasionally, data may be deleted intentionally or accidentally, while handling the multimedia contents. When the content is deleted by mistake, the user may want to recover the deleted content.

Korean Pat. No. 334682 discloses a method of recovering the message deleted from a mobile device and Korean Pat. No. 498351 discloses an initialization data recovery method. Also, Korean Pat. No. 515890 discloses an effective database recovery method.

However, such conventional data recovery methods are limited to recovering only the data type specified with the recovery program. These methods are not capable of recovering data generated by the application programs. That is, since the data recovery program is programmed without consideration of the user's requirement, it is difficult to achieve fidelity of the recovered data.

Also, the conventional data recovery method does not provide the user with a chance to configure the parameters of the recovery program, such as a type, volume, and scale of the data to be dealt with, for increasing the recovery accuracy.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a data recovery method which is capable of selectively recovering deleted data in a mobile device.

Another object of an exemplary embodiment of the present invention is to provide a data recovery method which is capable of improving recovery fidelity and accuracy by allowing the user to configure the recovery conditions of the recovery application of the mobile device.

In one aspect of an exemplary embodiment of the present invention, the above and other objects can be accomplished by a data recovery method of a mobile device. A portion of a memory is assigned as a data recovery region and recovery lists are created. Each recovery list comprises a recovery time, which is a duration required for recovering at least one item of the list, and a recovery volume. Data deleted from the memory is stored into the data recovery region in accordance with the recovery lists and the data recovery lists are displayed when a data recovery is requested. The deleted data is recovered from the data recovery region when the data to be recovered is selected from the recovery lists.

According to an exemplary implementation, the data recovery region is assigned in a Transactional File System type-4 (TFS4) region of the memory.

According to an exemplary implementation, the TFS4 region comprises a first sector which stores operation software and a second sector which is separated from the first sector. The data recovery region is assigned to the second sector.

According to an exemplary implementation, the creation of the recovery lists comprises an initialization of the data recovery region.

According to an exemplary implementation, during the creation of the recovery lists data that exceeds a capability of the data recovery region is discarded in an order of the recovery time.

According to an exemplary implementation, the data which is not registered on the recovery lists is permanently erased.

According to an exemplary implementation, the recovery lists are sorted in an order of recovery times.

According to an exemplary implementation, the recovery lists are sorted in orders of recovery time and data types.

According to an exemplary implementation, the recovery lists are sorted in an order of data types.

According to an exemplary implementation, the recovery time is determined in units of day, week, or month.

According to an exemplary implementation, the recovery volume is limited to a range of a capability of the data recovery region.

According to an exemplary implementation, the data recovered from the data recovery region is restored at a region of the memory from which the data was deleted.

In another aspect of an exemplary embodiment of the present invention, the above and other objects can be accomplished by a data recovery method of a mobile device. A portion of a memory is assigned as a data recovery region and recovery lists are created. Each recovery list comprises a recovery time and recovery volume. Data deleted from the memory is stored into the data recovery region in accordance with the recovery lists. The deleted data is recovered from the data recovery region when the data to be recovered is selected from the recovery lists.

During the creation of the recovery lists, recovery times and recovery volumes of the recovery lists are configured and data to be recovered is designated to the recovery lists.

According to an exemplary implementation, the recovery lists are displayed when data recovery is requested.

In another aspect of an exemplary embodiment of the present invention, the above and other objects can be accomplished by a data recovery system of a mobile device. The data recovery system comprises a keypad, a memory, a controller and a display. The keypad enters key selection information related to a data recovery. The memory comprises a data recovery region in which recovery lists are stored. The recovery lists are configured with recovery times and recovery volumes and designated data to be recovered. The controller stores the data deleted from the memory according to the recovery lists and restores the requested data to be recovered to an appropriate region of the memory. The display displays images related to the data recovery with the recovery lists under the control of the controller.

According to an exemplary implementation, the memory comprises a basic region for storing codes, fonts, and parameters of initial settings and a file system region for managing data storages. The file system region comprises the data recovery region.

According to an exemplary implementation, the file system region comprises an Embedded File System type-2 (EFS2) region and a Transactional File System type-4 (TFS4) region. The data recovery region is comprised in the TFS4 region.

According to an exemplary implementation, the TFS4 region is a NAND type flash memory.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
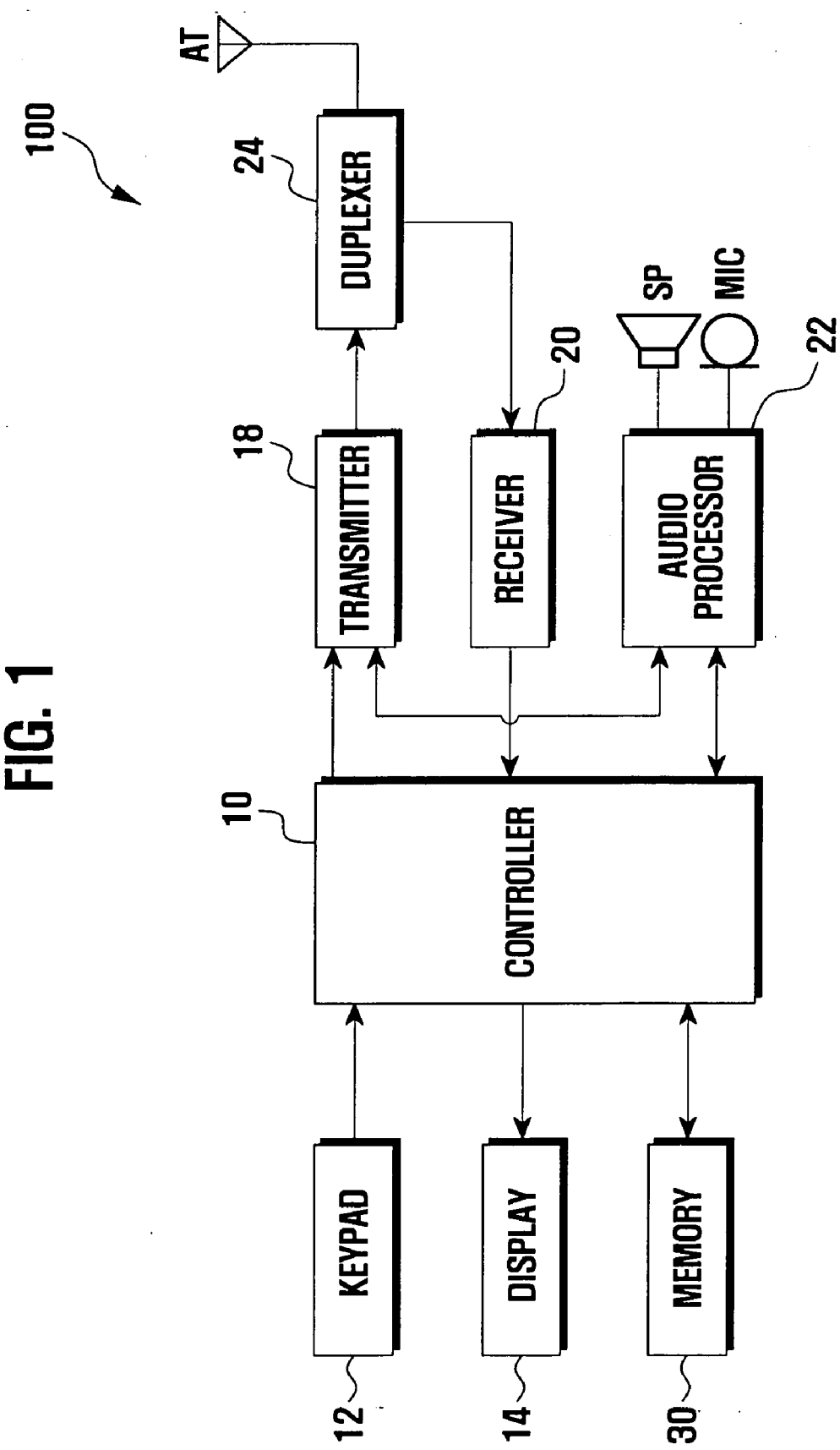
FIG. 1 is a block diagram illustrating a configuration of a mobile device according to an exemplary embodiment of the present invention.
Figure 2:
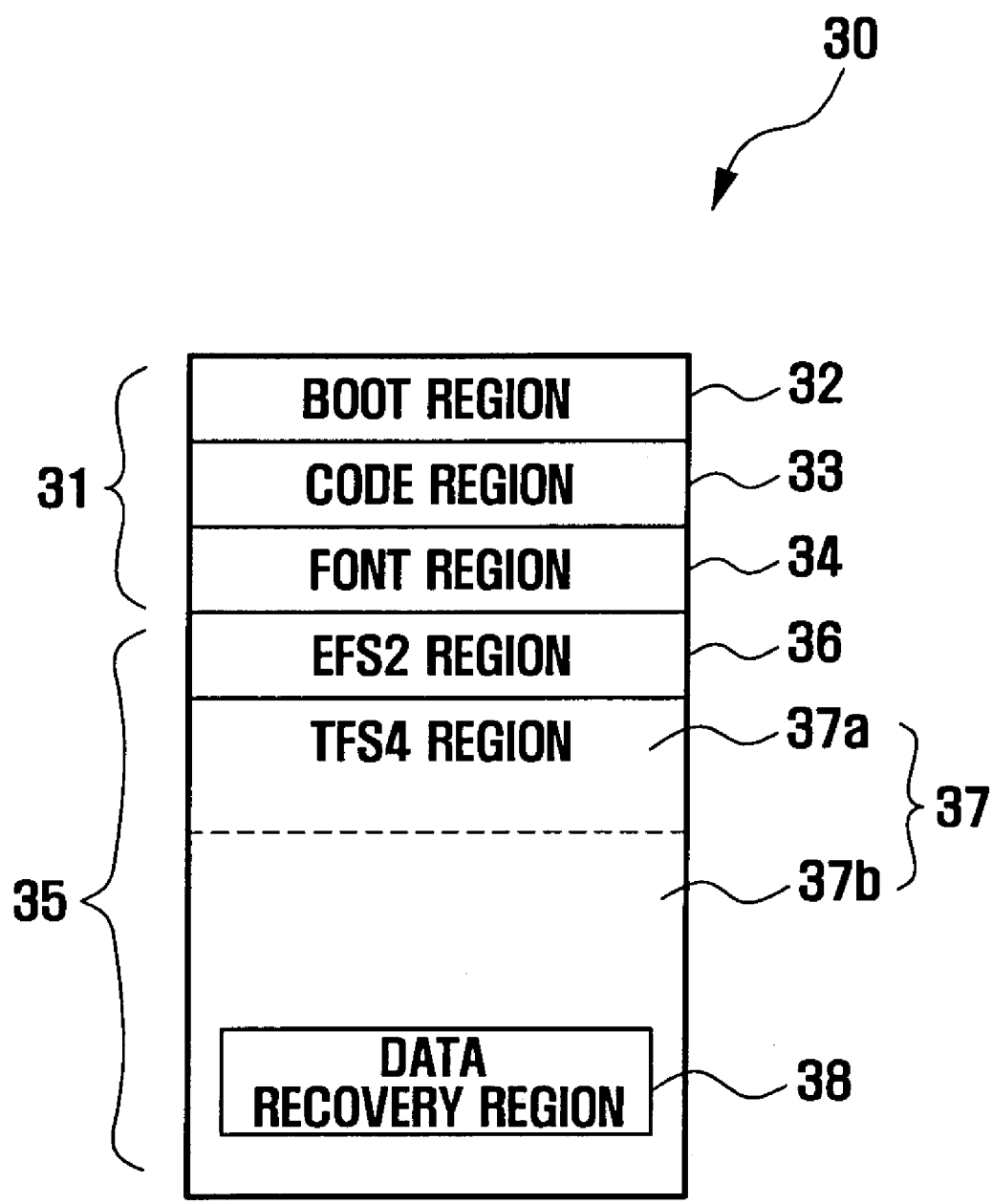
FIG. 2 is a schematic view illustrating a memory map of the memory in FIG. 1.

FIG. 1 is a block diagram illustrating a configuration of a mobile device according to an exemplary embodiment of the present invention, and FIG. 2 is a schematic view illustrating a memory map of the memory in FIG. 1.

Referring to FIG. 1, the mobile device 100 includes a controller 10, a keypad 12, a display 14, a transmitter 18, a receiver 20, an audio processor 22, a duplexer 24, and a memory 30.

The controller 10 controls overall operations of the mobile device 100. The memory 30 stores operation programs for operating the mobile device and application programs and data that is in use. The memory is provided with a data recovery region 38 (see FIG. 2).

The duplexer 24 isolates the transmitter 18 and the receiver 20 while permitting them to share a common antenna. The receiver 20 receives a radio signal separated by the duplexer 24 and performs amplification and filtering on the received incoming signal. The transmitter 18 filters and amplifies an outgoing signal and then outputs the amplified signal to the duplexer 24 to be transmitted through the antenna.

The audio processor 22 performs modulation on a sound signal input through a microphone and demodulation on the incoming sound signal for output through speakers.

The keypad 12 is provided with a set of keys which represent digits and symbols to generate a signal and transmit the signal to the controller 10 when any of the buttons are pushed. In this exemplary embodiment of the present invention, the keypad 12 allows a user to select an item to be recovered and transmits the selection information associated with the data recovery to the controller 10.

The display 14 is a liquid crystal display (LCD), which displays digits corresponding to the signal generated through the keypad 12 and information on the operation status of the mobile device under the control of the controller 10.

The controller 10 stores the data deleted by the user's manipulation into the data recovery region 38 of the memory 30. If a user's instruction for recovering the deleted data is input, the controller 10 recovers the deleted data from the data recovery region 38 and places the data in its original region, according to the user's selection.

The memory 30 comprises a basic region 31 which performs initial settings and stores codes and fonts and a file system region 35 for managing data storage. The file system region 35 also stores the data in use with an application.

The basic region 31 includes a boot region 32, a code region 33, and a font region 34. The boot region 32 is responsible for loading a boot sequence with the initialization data and parameters such that the mobile device is ready for communication. The code region and font region store the codes and fonts used in the mobile device, respectively.

The file system region 35 comprises an Embedded File System type-2 (EFS2) region 36 and a Transactional File System type-4 (TFS4) region 37.

The TFS4 region 37 can be implemented with a movable storage which stores data such as MP3 files, still and motion pictures taken by the built-in camera. The TFS4 region 37 can be a flash memory such as NAND or OneNAND flash.

According to an exemplary implementation, the file system region 35 assigns a data recovery region 38. The data recovery region may be assigned to the TFS4 region 37 in which utilization is more flexible than that of the EFS2 region 36.

The TFS4 region 37 comprises a first sector 37a for operation related software and a second sector 37b for the data recovery region 38.

The TFS4 region 37 can be partitioned into at least one internal or external region.

When the TFS4 region 37 has internal regions of /a/ to /d/ and an external region of /e/, it is preferable to use the internal region for the data recovery region. The TFS4 region uses region /a/, and one of the regions selected from /b/ to /d/ can be selected for the data recovery region 38. Accordingly, the internal region is divided into at least two partitions.

The first sector 37a is referred to as /a/ and the second sector 37b is referred to as /b/ to /d/. Because the internal region is divided into partitions, data recovery related information can be separately handled. It is possible to access the data recovery region 38 to perform an initialization routine. The data recovery region 38 can be set as much as possible without exceeding the range of the second region 37. The data recovery region 38 may also be set in the manufacture of the mobile device 100.

The deleted data can be stored in the data recovery region in the form of a recovery list created by the controller 10 according to the user's selections. The controller 10 configures the recovery time and volume of the files listed in the recovery list on the basis of the user's selection and displays the information through the display 14.

The operations of the above structured mobile device, according to another exemplary embodiment of the present invention, are described with reference to the drawings.

Figure 3A:
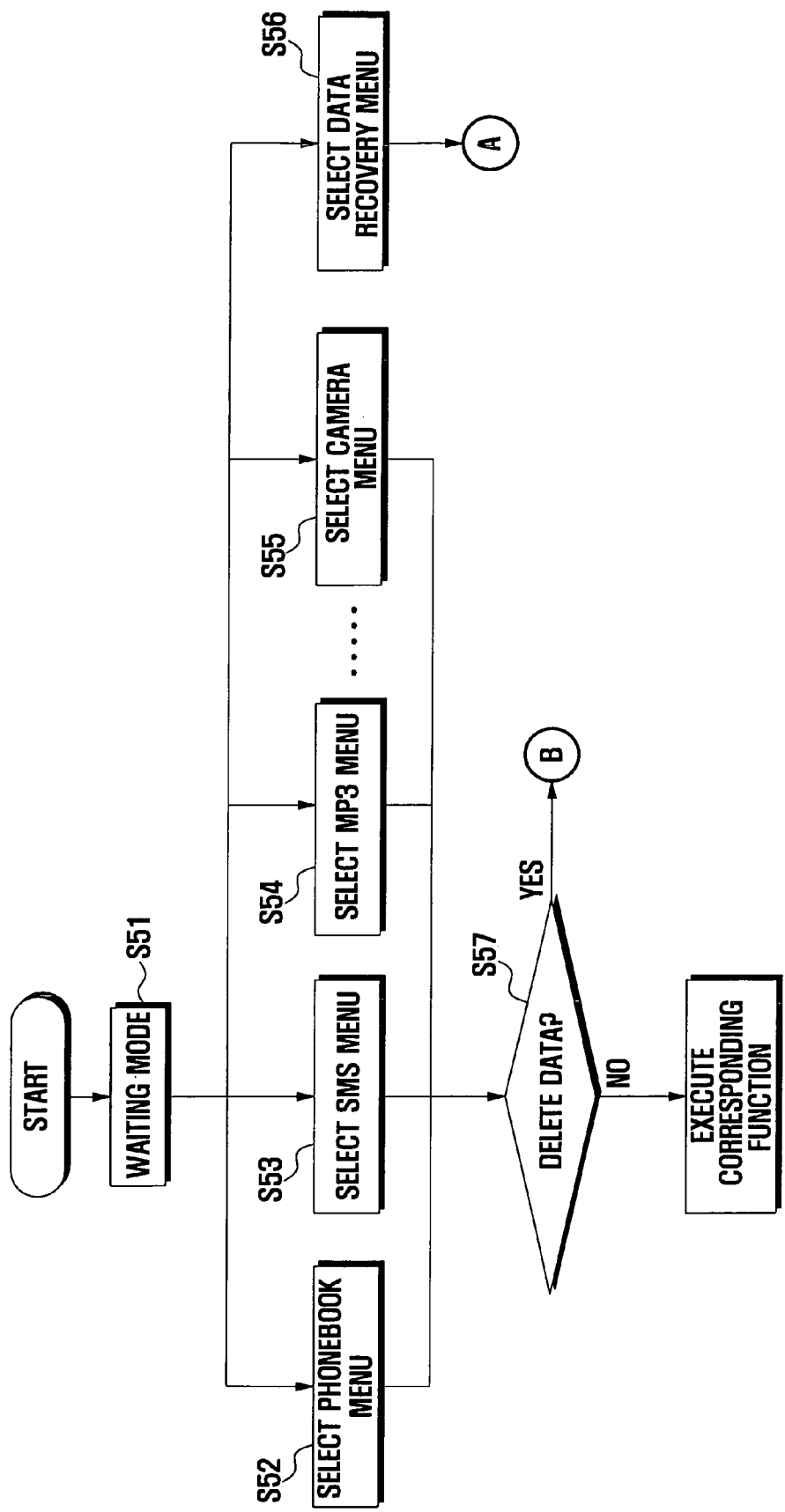
FIGS. 3A and 3B are flowcharts illustrating a data recovery method of a mobile device according to another exemplary embodiment of the present invention.
Figure 3B:
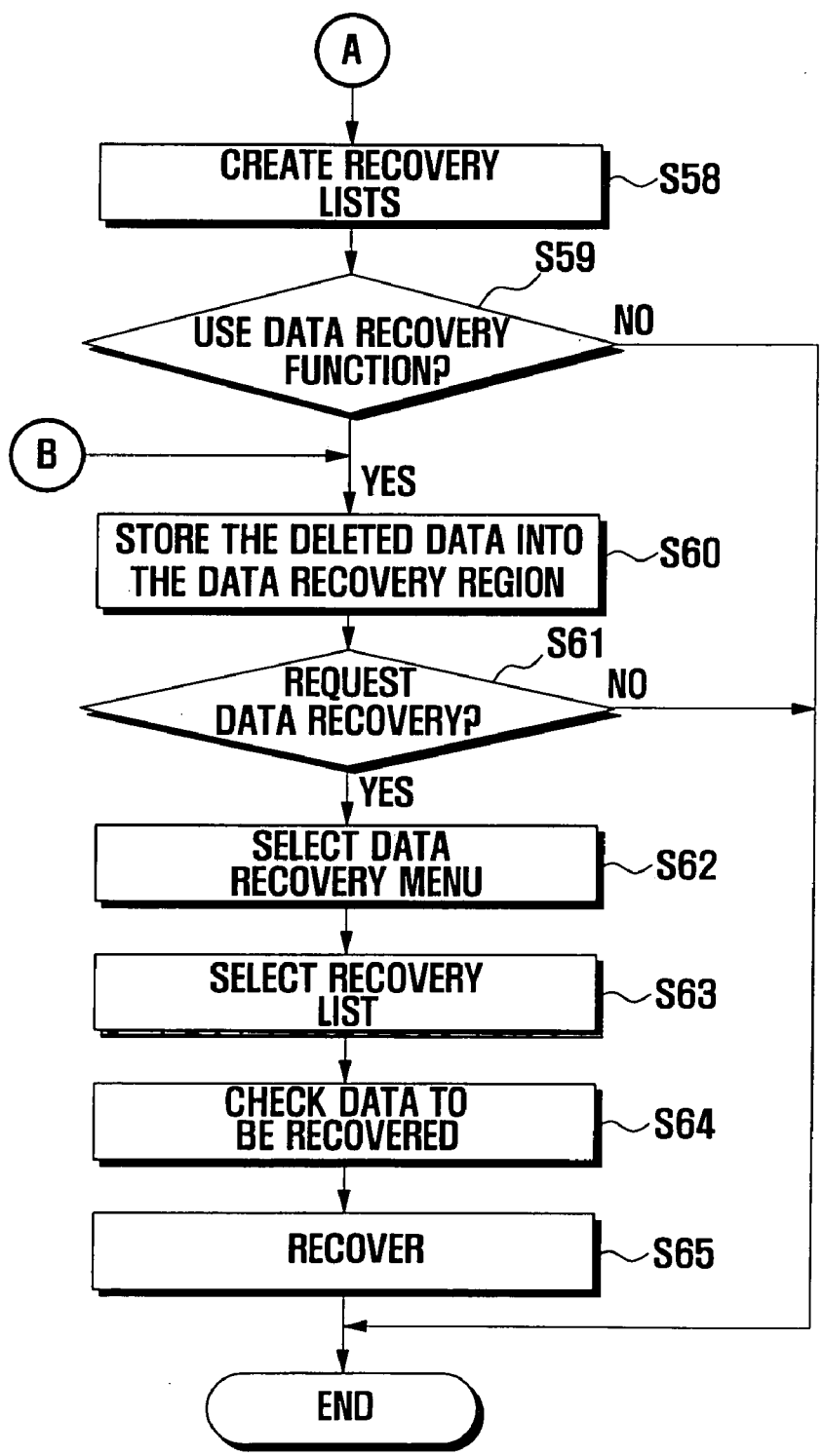

FIGS. 3A and 3B are flowcharts illustrating a data recovery method of a mobile device, according to an exemplary embodiment of the present invention. FIGS. 4A to 4D are examples of screen images illustrating data recovery steps of the data recovery method of FIGS. 3A and 3B.

Referring to FIG. 3A, once the mobile device is turned on, the controller 10 of the mobile terminal initializes the mobile device by reading initialization data and operation related parameters. This facilitates the mobile device's entry into a waiting mode at step S51.

In this exemplary embodiment of the present invention, the data check and deletion is performed in a typical manner. That is, if a menu item is selected by the user's keypad manipulation at steps S52 to S56, the controller 10 displays the data associated with the selected menu item on the display 14. The menu can list the items such as phonebook, SMS, MP3, camera, and data recovery memory, among others. The controller 10 allows the user to check the data associated with each menu item and select the data to be deleted at step S57.

As described above, the memory 10 is provided with the data recovery region 38 and the data which is deleted intentionally or accidentally is stored in the data recovery region 38 so that the deleted data is presented while an associated menu item is selected.

The data recovery is initially selected among the menu items by the user's keypad manipulation at step S56 In order to activate the data recovery application. When the data recovery item is selected, a data recovery submenu is presented (see FIG. 4a). The data recovery submenu includes three submenu items: 1. settings, 2. recovery list, and 3. initialization.

Figure 4A:
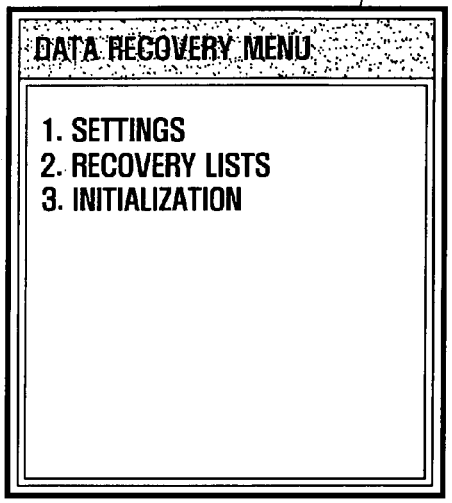
FIGS. 4A to 4D are examples of screen images explaining data recovery steps of the data recovery method according to an exemplary embodiment of the present invention.
Figure 4B:
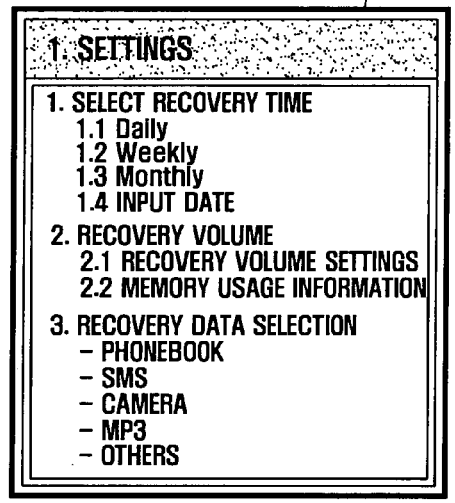

Referring to FIG. 4B, the submenu item '1. Settings' is provided with three options entitled 'recovery time', 'recovery volume', and 'recovery data selection.'

Each option of the settings item comprises s sub-options. That is, the recovery time option includes sub-options of 'daily', 'weekly', 'monthly', and 'data input' such that the user can select one of the options one step at a time. The recovery volume option includes sub-options of 'recovery volume settings' and 'memory usage information.' In the meantime the recovery data selection option includes the applications titles supported by the mobile device and associated with the deleted data, such as, phonebook, SMS, Camera, MP3, and others.

Accordingly, the user can configure the recovery time and volume through the data recovery menu. If more than one recovery data is designated, the controller 10 creates a recovery data list at step S58 of FIG. 3B. The recovery data list can be verified through the 'recovery list' submenu item of FIG. 4B.

Figure 4C:
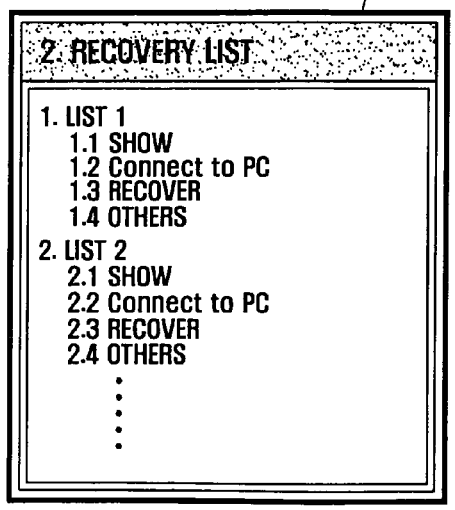

As illustrated in FIG. 4C, the submenu item '2. recovery list' is provided with several options corresponding to the lists, such as, list 1, list 2, . . . , and list n (n is an integer). And each list includes sub-options: 'show', 'connect to PC', 'recovery', and 'others.'

If the sub-option 'show' is selected, the controller 10 displays the data stored in the data recovery region corresponding to the data recovery time on the display 14. Also, if the sub-option 'connect to PC' is selected, the controller 10 establishes a wireless link to a PC. The wireless link facilitates data sharing and data exchange. While the mobile device and the PC are connected, the user can manipulate the data with the PC. The sub-option 'recover' is selected when the user has determined the data that is to be recovered through the sub-options 'show' and 'connect to PC.' Also, the sub-option 'others' may comprise useful information related to the data recovery.

Figure 4D:
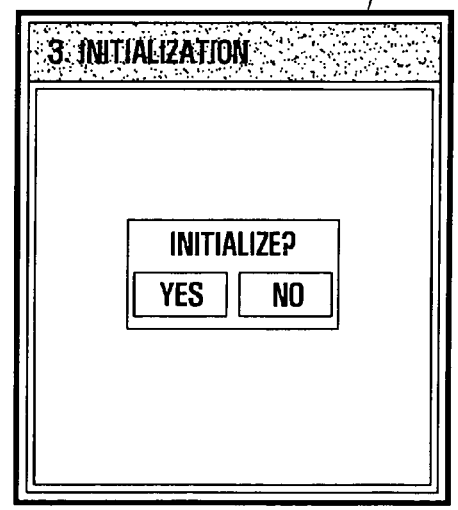

As illustrated in FIG. 4D, if the submenu item '3. Initialization' is selected from the screen of FIG. 4A, the controller 10 displays a screen comprising an initialization option and a cancel option. Accordingly, if the initialization option is selected, the controller performs the initialization routine so as to initialize the data recovery region 38.

Once the recovery lists have been created, the controller 10 determines whether to use the data recovery function at step S59 of FIG. 3B. If the data recovery function is to be used, the controller 10 stores the deleted data into the data recovery region 38 (S60). If the data recovery function is not to be used, the controller 10 does not store the deleted data.

After the data recovery function is enabled, the controller 10 determines whether a data recovery request has been input through the keypad 12 (S61).

If a data recovery request is input, the controller 10 receives a data recovery menu selection (S62) and the recovery list (S63) such that the user can check the data to be recovered (S64).

Finally, the controller 10 performs the data recovery (S65) on the data selected by the user and writes the data in a region of the memory 30, in which the data was stored. The recovery volume can be determined according to the recovery time, recovery data, and type of the recovery data. Preferably, the total recovery volume does not exceed the capacity of the second region.

In this exemplary embodiment of the present invention, the recovery lists are arranged in an order of recovery times. The arrangement is not limited to the recovery time order, but can also be arranged by types of the data, recovery volume, and other parameters.

As described above, the data recovery method of the exemplary embodiment of the present invention facilitates recovery of the data deleted intentionally or accidentally in a mobile device.

The data recovery method of the exemplary embodiment of the present invention allows a user to configure the recovery time, the recovery volume, and the type of data to be recovered, such that it is possible to effectively utilize the memory space.

Further, the data recovery method of the exemplary embodiment of the present invention supports data share between the mobile device and a personal computer, facilitating the user's ability to conveniently check and manage the deleted data.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A data recovery method of a mobile device, comprising:
    assigning a portion of a memory of the mobile device as a data recovery region of the mobile device reserved for recovery of data deleted by a user;
    creating and storing, in the memory, recovery lists each configured with parameters comprising a recovery time comprising a duration period during which at least one item of the recovery list is recoverable, a recovery volume, and a type of data designated for recovery and comprising a list of deleted data items stored in the data recovery region for recovery in accordance with the parameters;
    determining, when a data item stored in the mobile device is deleted, whether the data type of the deleted data item is designated for recovery in the recovery lists;
    storing the deleted data item into the data recovery region in accordance with the parameters of the recovery lists and adding the deleted data item into one list of the recovery lists;
    displaying the recovery lists in a display of the mobile device when a data recovery is requested such that the deleted data item can be selected from the one list of the recovery lists; and
    recovering the deleted data item from the data recovery region when the deleted data item is selected from the one list of the recovery lists;
    wherein the storing of the deleted data item comprises permanently erasing the deleted data item when the data type of the deleted data item is not designated in any of the recovery lists;
    wherein the data recovered from the data recovery region is restored at a region of the memory from which the data was deleted.

2. The method of claim 1, wherein the data recovery region is assigned in a Transactional File System type-4 (TFS4) region of the memory.

3. The method of claim 2, wherein the TFS4 region comprises:
    a first sector for storing operation software; and
    a second sector separated from the first sector, wherein the data recovery region is assigned to the second sector.

4. The method of claim 1, wherein the creating of the recovery lists comprises initializing the data recovery region.

5. The method of claim 3, wherein the creating of the recovery lists comprises discarding data which is larger than a capability of the data recovery region in an order of the recovery time.

6. The method of claim 3, wherein the recovery lists are sorted by an order of recovery times.

7. The method of claim 3, wherein the recovery lists are sorted by orders of recovery time and data types.

8. The method of claim 3, wherein the recovery lists are sorted by an order of data types.

9. The method of claim 1, wherein the recovery time is determined in at least one of a unit of day, week, and month.

10. The method of claim 9, wherein the recovery volume is limited to a range of a capability of the data recovery region.

11. A data recovery system of a mobile device, comprising:
    a keypad for entering key selection information related to a data recovery;
    a memory of the mobile device comprising a data recovery region reserved for recovery of data deleted by a user and in which recovery lists are stored, wherein the recovery lists are each configured with parameters comprising a recovery time comprising a duration period during which at least one item of the recovery list is recoverable, a recovery volume, and a type of data designated for recovery, and comprising a list of deleted data items stored in the data recovery region for recovery in accordance with the parameters;
    a controller for determining, when a data item stored in the mobile device is deleted, whether the data type of the deleted data item is designated in the recovery lists, for storing the deleted data item into the data recovery region according to the parameters of the recovery lists, for adding the deleted data item into one list of the recovery lists, and for recovering the deleted data item from the data recovery region when the deleted data item is selected from the one list of the recovery lists; and
    a display for displaying the recovery lists such that the deleted data item can be selected from the one list of the recovery lists, under the control of the controller;
    wherein the storing of the deleted data item comprises permanently erasing the deleted data item when the data type of the deleted data item is not designated in any of the recovery lists;
    wherein the data recovered from the data recovery region is restored at a region of the memory from which the data was deleted.

12. The system of claim 11, wherein the memory comprises:
    a basic region for storing codes, fonts, and parameters of initial settings; and
    a file system region for managing data storages, wherein the file system region comprises the data recovery region.

13. The system of claim 12, wherein the file system region comprises an Embedded File System type-2 (EFS2) region and a Transactional File System type-4 (TFS4) region, wherein the TFS4 region comprises the data recovery region.

14. The system of claim 13, wherein the TFS4 region comprises a NAND type flash memory.

15. The data recovery method of claim 1, wherein the recovery time comprises a duration required for recovering at least one item of the list.

* * * * *